US006264145B1

(12) United States Patent
Maute

(10) Patent No.: US 6,264,145 B1
(45) Date of Patent: *Jul. 24, 2001

(54) GEOSTATIONARY EARTH OBSERVATION SATELLITE INCORPORATING MULTIPLE THRUSTER LIQUID PROPELLANT APOGEE MANEUVER SYSTEM

(75) Inventor: Patrick Maute, Valbonne (FR)

(73) Assignee: Aerospatiale Societe Nationale Industrielle (FR)

(*) Notice: Subject to any disclaimer, the term of this patent is extended or adjusted under 35 U.S.C. 154(b) by 0 days.

This patent is subject to a terminal disclaimer.

(21) Appl. No.: 09/391,554

(22) Filed: Sep. 8, 1999

Related U.S. Application Data

(63) Continuation of application No. 09/176,712, filed on Oct. 21, 1998, now Pat. No. 6,082,678, which is a continuation of application No. 08/302,388, filed on Sep. 8, 1994, now abandoned, and a continuation of application No. 07/659,515, filed on Feb. 21, 1991, now abandoned.

(30) Foreign Application Priority Data

Feb. 26, 1990 (FR) .................................................. 90 02366
Jul. 13, 1990 (FR) .................................................. 90 08969

(51) Int. Cl.$^7$ .................................................. B64G 1/40
(52) U.S. Cl. .................................... 244/172; 244/158 R
(58) Field of Search .................................. 244/158, 164, 244/172; 342/352, 62; 455/427, 12.1

(56) References Cited

U.S. PATENT DOCUMENTS

| 3,758,051 | * | 9/1973 | Williams | 244/1 SA |
|---|---|---|---|---|
| 3,817,477 | * | 6/1974 | Luther et al. | 244/1 SS |
| 3,817,481 | * | 6/1974 | Berks et al. | 244/1 SS |
| 4,842,223 | * | 6/1989 | Allton et al. | 244/158 R |
| 4,880,185 | * | 11/1989 | Apfel | 244/135 B |
| 4,911,385 | * | 3/1990 | Agrawal et al. | 244/165 |
| 4,961,551 | * | 10/1990 | Rosen | 244/164 |
| 5,142,150 | * | 8/1992 | Sparvieri et al. | 250/336.2 |
| 5,169,094 | * | 12/1992 | Maute et al. | 244/158 R |
| 5,546,309 | * | 8/1996 | Johnson et al. | 364/434 |
| 5,582,369 | * | 12/1996 | Blancke | 244/170 |

* cited by examiner

Primary Examiner—Charles T. Jordan
Assistant Examiner—Kevin Jakel
(74) Attorney, Agent, or Firm—Vanophem & Vanophem, P.C.

(57) ABSTRACT

A satellite designed to be spin-stabilized in geostationary orbit which has, coaxial with a spin rotation axis, a satellite body surrounded with a cylindrical solar generator, an apogee maneuver system disposed along the axis and two axially disposed equipments. The apogee maneuver system has opposite one of the equipments at least two thrusters oriented parallel to the axis but offset relative thereto by the same distance. Equi-angularly spaced around the other of the two equipments, the thrusters are connected to a common liquid propellant feed system.

16 Claims, 6 Drawing Sheets

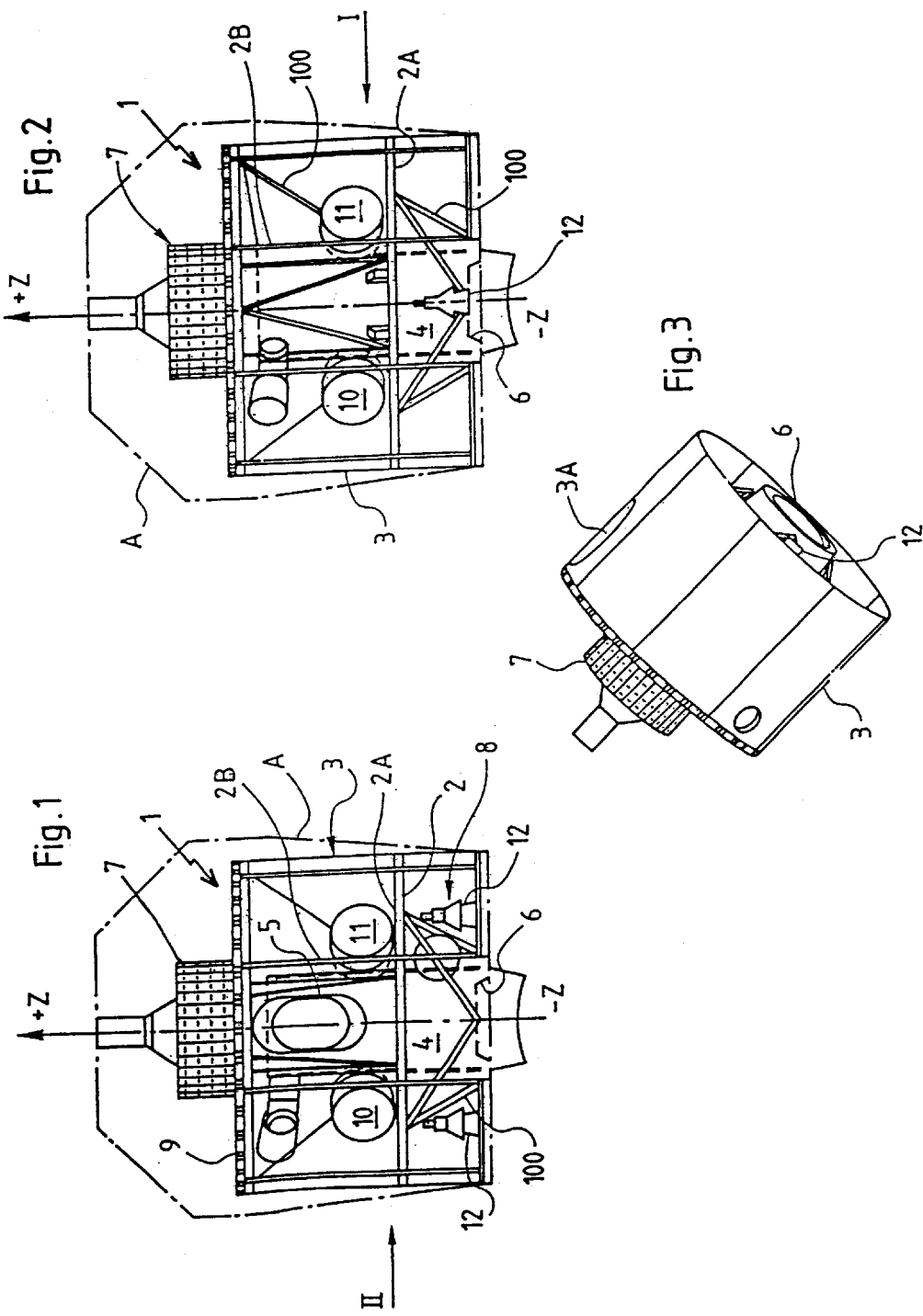

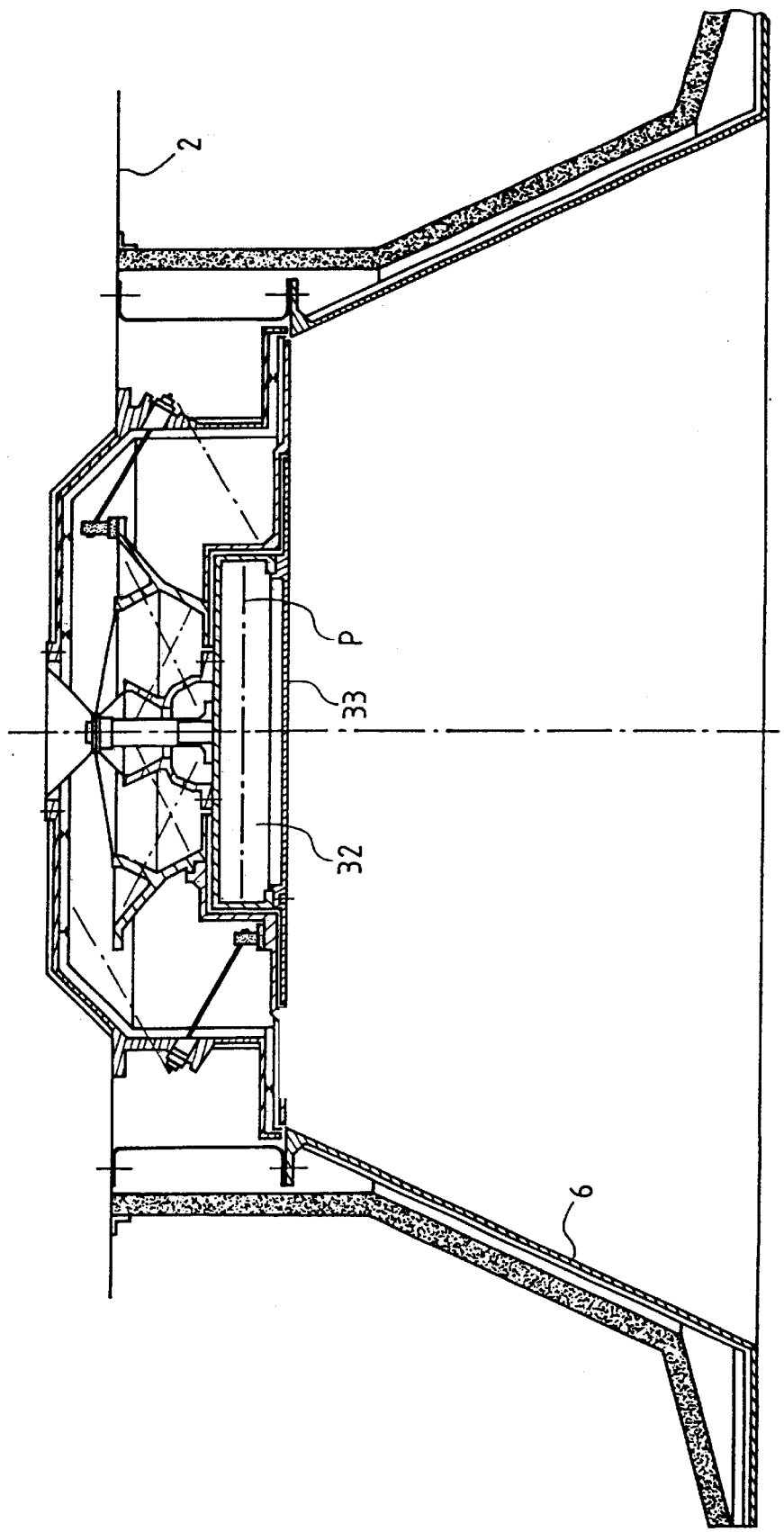

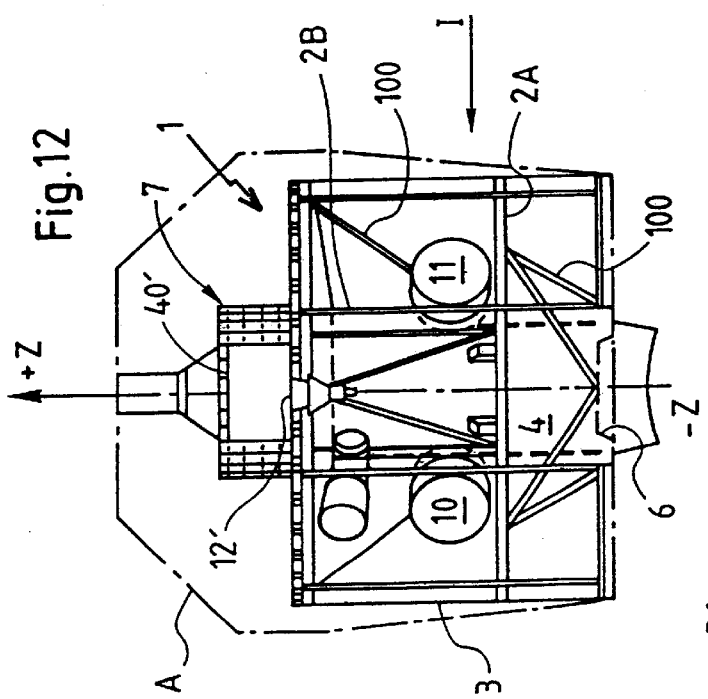
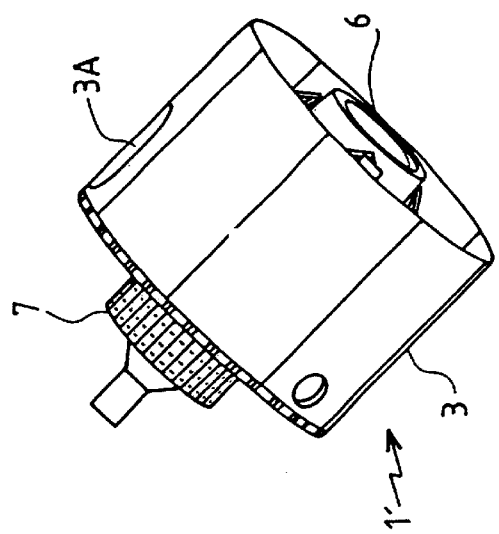
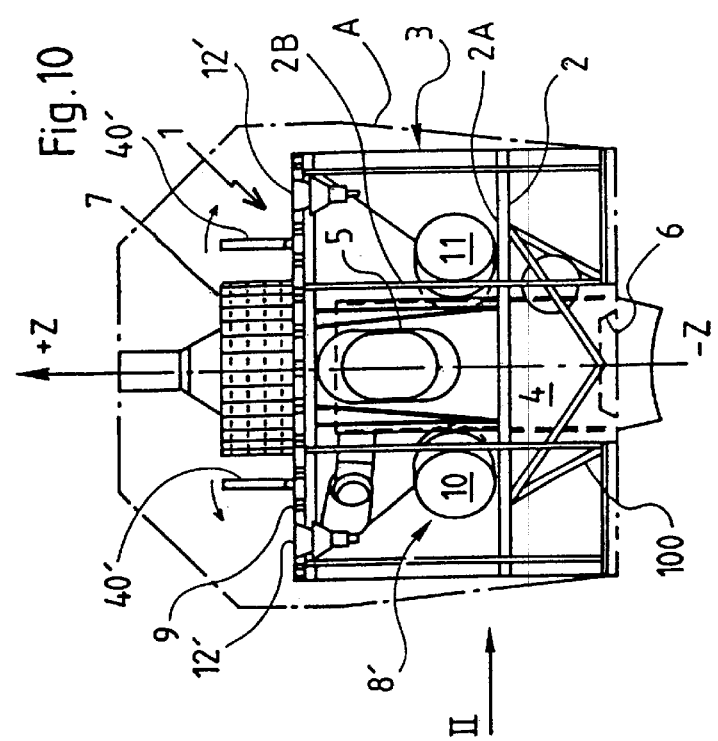

GEOSTATIONARY EARTH OBSERVATION SATELLITE INCORPORATING MULTIPLE THRUSTER LIQUID PROPELLANT APOGEE MANEUVER SYSTEM

CROSS-REFERENCES TO RELATED APPLICATIONS

This application is a continuation of application Ser. No. 09/176,712, filed Oct. 21, 1998, issued Jul. 4, 2000 as U.S. Pat. No. 6,082,678; that was a continuation of application Ser. No. 08/302,388, filed Sep. 8, 1994, now abandoned; and a continuation of application Ser. No. 07/659,515, filed Feb. 21, 1991, also now abandoned.

BACKGROUND OF THE INVENTION

1. Field of the Invention

The present invention concerns the general structure of satellites, for example observation satellites and in particular earth observation satellites. It is particularly directed to spin-stabilized satellites; it is particularly, but not exclusively, concerned with meteorological satellites.

2. Description of the Prior Art

Spin-stabilized geostationary meteorological satellites have already been used by the United States, the Soviet Union, Japan and Europe as part of the WWW (World Weather Watch) meteorological observation program. Such satellites include the US GOES 1 and 4 satellites, the European MOP satellite and the Japanese GOIS satellite.

Until now terrestrial observation satellites have always been spin-stabilized and have always used solid propellant apogee maneuver systems.

At the present time various projects are in hand, in particular in the United States and in Europe, towards launching second generation satellites, so called to distinguish them from existing (or first generation) satellites; these second generation satellites are intended to have significantly better performance than first generation satellites, especially with regard to the number of channels and pointing accuracy; this implies a dry mass much greater than that of first generation satellites (some 800 to 1,500 kg, as compared with approximately 300 to 350 kg previously).

Since the time when the first generation satellites were designed and launched, important changes have occurred in the field of satellite propulsion, applicable to geostationary and other type satellites: the use of solid propellant apogee motors has given way to the use of liquid propellant propulsion systems.

This general adoption of liquid propellants as opposed to solid propellants is explained by their better specific impulse, the possibility of providing a unified propellant system for the apogee maneuver, orbit correction and attitude control systems, increased operational flexibility (the facility to carry out an apogee maneuver in a number of phases) and a more flexible concept (the liquid propellant tanks are filled immediately before launch to the maximum allowable mass of the satellite, whereas previously it would have been necessary to choose the solid propellant motor and its propellant tank at some stage during the development process on the basis of the projected mass of the completed satellite). The use of liquid propellants results in a significant saving of mass at launch.

One consequence of this trend is that there is not available in Europe at this time any flight-qualified solid propellant apogee motor suitable for the masses typical of modern satellites (800 to 1,500 kg dry mass).

Also, the use of liquid propellant apogee thrusters poses a particular and critical problem in the case of observation satellites (especially meteorology satellites) that are spin-stabilized.

The role of observation satellites entails imaging the earth and/or its atmosphere in the infrared band. The sensors used for this have to be cooled to low temperatures, in the order of 100 K, to achieve acceptable signal/noise characteristics. These low temperatures are conventionally obtained by placing the focal plane of the observation instrument (on which the infrared sensors are located) under a frustoconical radiator disposed on a transverse face of the satellite facing towards deep space, in order to minimize the flow of energy, especially solar energy, from the exterior and prejudicial to the removal of heat by the radiator. The frustoconical side wall of the radiator is conventionally inclined at an angle slightly greater than 23.5° to a plane transverse to the spin rotation axis and is highly polished (it is usually made from aluminum) to make it highly reflective and to reject outside the radiator any incident solar radiation, even under worst case conditions (in particular, the winter solstice when the radiator is on the SOUTH face of the satellite).

In all first generation satellites the field of view of the passive radiator towards deep space (towards the SOUTH) was achieved by jettisoning the solid propellant apogee motor after the burn; the radiator was sittated immediately behind the apogee motor, at the satellite/apogee motor interface. From this point of view the solid propellant apogee motor has the advantage of constituting with its propellant tank a compact and easily jettisoned assembly.

The opposite (NORTH) face of the satellite is conventionally occupied by the ground communication antennas which conventionally include a telecommunication boom disposed accurately along the spin rotation axis of the satellite.

Jettisoning the apogee maneuver system appears to be out of the question in the case of a liquid propellant system (especially with a unified propellant system), given that the propellant for the apogee burn is fed to the apogee thruster (which is accurately oriented along the spin rotation axis) from storage tanks inside the body of the satellite by means of pipes and that it is not feasible, for reasons connected with sealing, to provide a break between the storage tanks and the apogee thruster to allow the latter to be jettisoned.

Designing spin-stabilized geostationary observation satellites, therefore, requires a solution to be found to the following technical problem: how to install the axially disposed antennas, the axially disposed liquid propellant apogee maneuver system and the axially disposed radiator of the observation system while simultaneously meeting constraints associated with spin rotation of the satellite. In particular, the observation system conventionally includes mobile optical parts which it has seemed essential to keep as close as possible to the spin rotation axis to protect them from excessive centrifugal forces. On a more general level, the problem is to locate on the rotation axis of a spin-stabilized satellite an axial propulsion system and two axial equipments, in this instance an antenna boom and a radiator.

SUMMARY OF THE INVENTION

The present invention is a satellite adapted to be spin-stabilized in geostationary orbit which, coaxial with a spin rotation axis, has a satellite body surrounded with a cylindrical solar generator, an apogee maneuver system disposed along the axis and two axially disposed equipments. The apogee maneuver system is secured opposite one of the equipments and has at least two thrusters oriented parallel to the axis but offset relative thereto by the same distance. Equi-angularly spaced around the other of the two equipments, the thrusters are connected to a common liquid propellant feed system.

An innovative feature of the invention is that it caters for the use of multiple thrusters so that previously flight-qualified thrusters can be used even though the satellite mass is increased.

Preferred embodiments of the invention can incorporate any of the following features or combinations thereof:

The other equipment disposed between the thrusters is a set of communication antennas;

the equipment opposite which the apogee maneuver system is mounted is a radiator which is part of an infrared sensor observation system;

or as an alternative, the equipment opposite which the apogee maneuver system is mounted is a set of communication antennas, the equipment situated between the thrusters optionally being the aforementioned radiator;

there are two thrusters disposed symmetrically on opposite sides of the spin rotation axis;

the distance by which the thrusters are offset from the axis is at least half the radius of the cylindrical solar generator;

the distance by which the thrusters are offset relative to the axis is at least two thirds of the radius of the cylindrical solar generator;

the radiator is covered by a jettisonable cover;

the jettisonable cover is a cold source and heaters are disposed around the radiator and are adapted, when activated, to decontaminate the lower part of the satellite;

the jettisonable cover is coupled to the satellite body, radially outside the radiator, by explosive bolts;

energy storing spring means are disposed axially between the jettisonable cover and the satellite body and adapted to jetison the cover;

the spring means are axially compressed spiral springs;

a heat shield is disposed between the set of antennas and the thrusters;

the heat shield includes articulated flaps adapted to open up the field of view of the antennas towards the Earth after the apogee maneuver; and the liquid propellant feed system is also adapted to feed orbit correction and attitude control thrusters.

It will be understood that this concept of multiple apogee thrusters initially came up against considerable resistance on the part of those skilled in the art. In particular, the problem was raised of determining the behavior of the satellite in response to the conjugate thrust from two or more thrusters in the event of possible desynchronization of the thrust and/or differences in the offset of the thruster axes, or even in the event of different magnitudes of thrust. Another problem was the extent of the modifications needed to the liquid propellant feed system of the satellite to enable it to supply propellant reliably and in a synchronized manner to two or more thrusters. Finally, the location of radiating equipment (antennas or radiator) near the thruster nozzles might cause excessive pollution (by contamination and thermal effect) due to the operation of the thrusters.

The invention is based on the gyroscopic stiffness of the satellite, because it is spin-stabilized before the apogee maneuver; trials have shown that this gyroscopic stiffness is sufficient in the case of second generation satellites, given their mass and speed of rotation, to maintain within acceptable limits the unwanted effects of any of the aforementioned thruster construction or operation faults.

The invention makes provision for realistic means of limiting the pollution of the equipment by the thrusters in the case of a radiator by temporarily masking the latter using a simple construction jettisonable cover made from conventional type super-insulating material or, more generally, jettisonable or articulated screens (flaps which fold over the nozzles after the apogee maneuver).

It has been found that the use of multiple thrusters makes it possible to achieve virtually all of the saving in mass achieved for other types of satellites because of the change from solid propellant propulsion to liquid propellant propulsion and a single thruster.

Objects, characteristics and advantages of the invention will emerge from the following description given by way of non-limiting example with reference to the appended diagrammatic drawings.

BRIEF DESCRIPTION OF THE DRAWINGS

FIG. 1 is a partially cut away axial schematic view of a satellite in accordance with the invention, as seen in the direction of the arrow I in FIG. 2, fitting within the payload space available in an ARIANE type launch vehicle;

FIG. 2 is another axial view of the satellite as seen in the direction of the arrow II in FIG. 1;

FIG. 3 is a schematic perspective view of the satellite;

FIG. 8 is a view in axial cross-section of the radiator of the optical observation system;

FIG. 10 is a view similar to FIG. 1 of a second embodiment wherein the thrusters are disposed around the antenna boom; and FIGS. 11 and 12 are views similar to those of FIGS. 2 and 3 corresponding to the second embodiment depicted in FIG. 10.

DETAILED DESCRIPTION OF THE INVENTION

Figure 4:
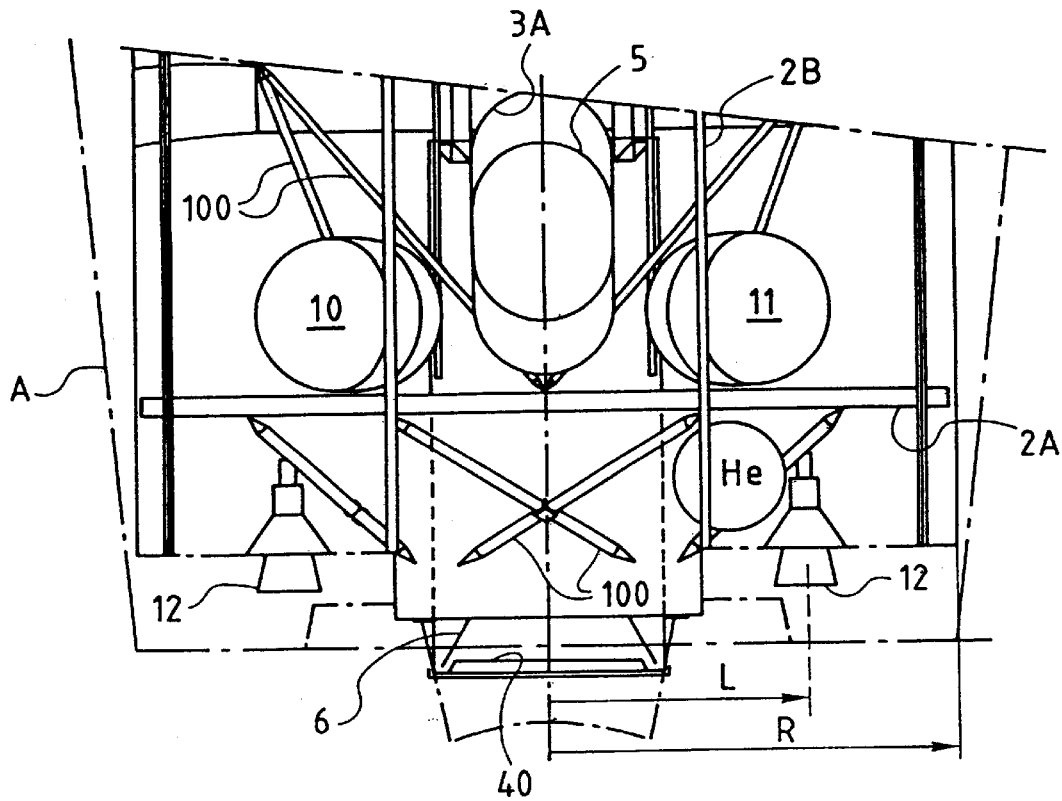
FIG. 4 is an enlarged detailed view of the bottom portion of FIG. 1.

FIGS. 1 through 3 show an observation satellite 1 designed to be spin-stabilized about an axis −Z+Z in a geostationary orbit.

In FIG. 1, the satellite is shown inside a chain-dotted outline A representing the space available for it in an ARIANE type double payload and launch structure.

The satellite has a body 2 surrounded by a cylindrical envelope 3 covered with solar cells and constituting a solar generator, an infrared optical observation system 4 with a radial input baffle 5 and a radiator 6 disposed on a SOUTH transverse face of the body, a set of telecommunication and picture transmission antennas 7 projecting from a NORTH transverse face, on the opposite side to the transverse face carrying the radiator, and an axially disposed apogee propulsion system 8.

Referring to FIGS. 1 and 2, the satellite body 2 or service module conventionally is composed of a main platform 2A disposed transversely and a center tube 2B disposed axially and fastened to the platform.

Figure 7:
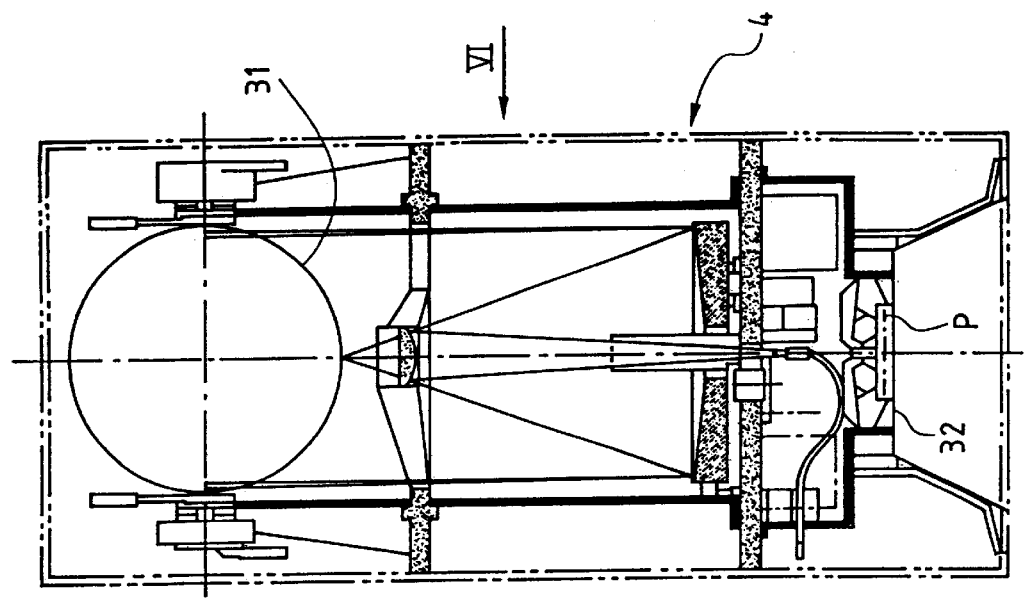
FIG. 7 is an analogous view of the optical observation system as seen in the direction of the arrow VII in FIG. 6.
Figure 6:
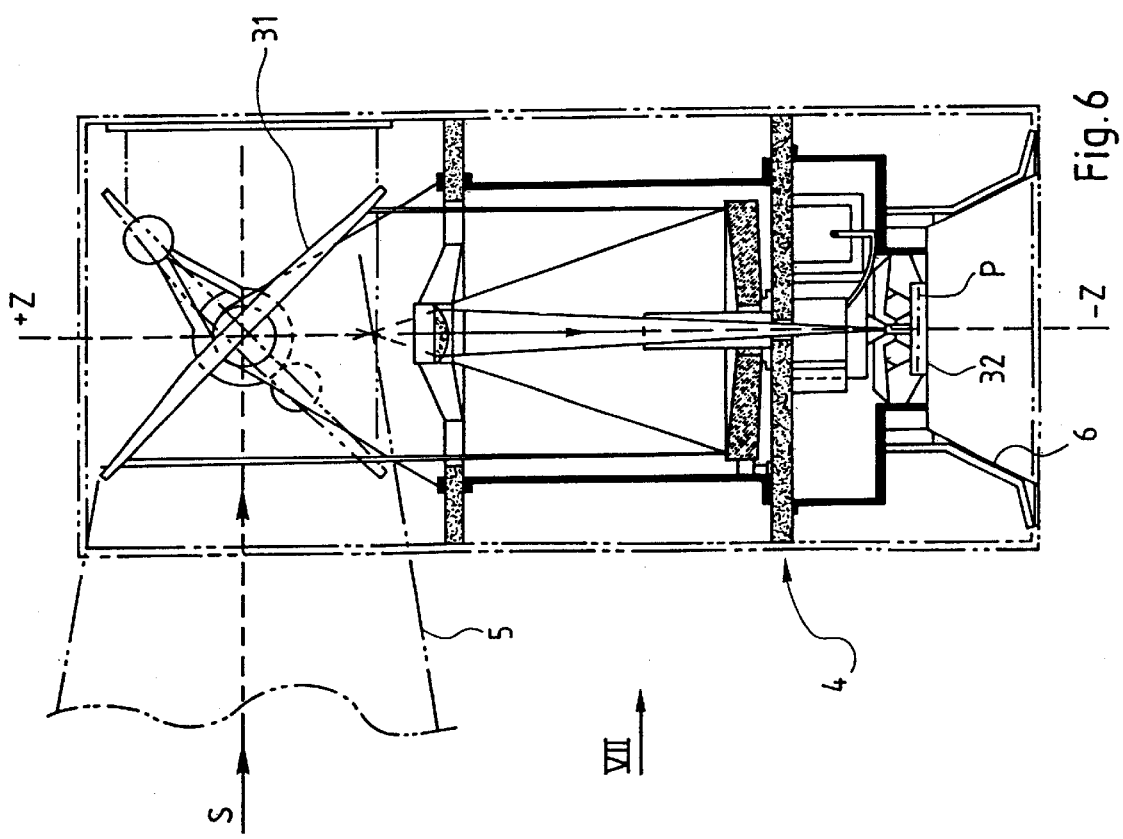
FIG. 6 is a partially cut away schematic axial view of the optical observation system as seen in the direction of the arrow VI in FIG. 7.

Inside the center tube 2B is the observation system 4 shown in more detail in FIGS. 6 and 7, the baffle 5 (not shown in FIG. 2) passing through the center tube and being disposed facing an opening 3A formed in the solar generator (see FIG. 3).

The upper part of the satellite body 2 is closed by an upper platform 9 to which the antennas 7 are attached. As the antennas do not form part of the present invention they will not be described in more detail here; they are of any known type appropriate for fulfilling the telecommunication and picture transmission roles of the satellite.

The apogee propulsion system 8 is disposed around the center tube 2B. This system includes a unified propellant system connected also to attitude control and orbit correction thrusters of any appropriate known type (shown in FIG. 5 only with the reference number 35).

Figure 5:
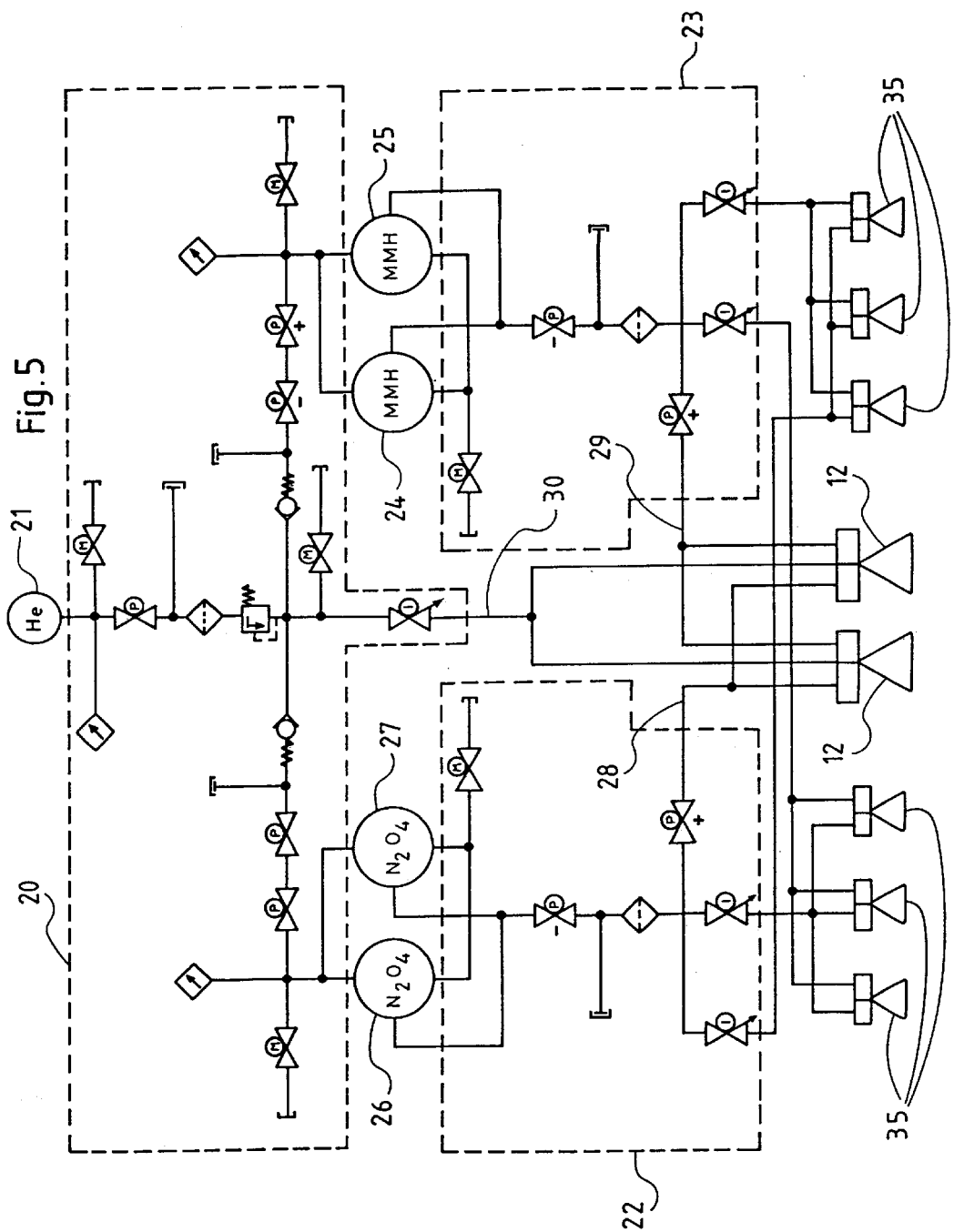
FIG. 5 is a simplified hydraulic circuit diagram of the liquid propellant circuit of the apogee maneuver, orbit correction and attitude control system.

The apogee propulsion system 8 is shown in detail in FIG. 5 and includes propellant tanks 10 and 11 held in place in the satellite body by various stiffener and fixing cross members of any appropriate known type, some of which are shown in FIGS. 1, 2 and 4 with the reference number 100.

Referring to FIG. 4, the apogee propulsion system 8 does not just have a single thruster disposed on the spin rotation axis as in known spin-stabilized observation satellites, but rather has a plurality of identical thrusters 12 equi-angularly arranged around and at equal distances L from the axis. In the example under discussion there are two thrusters 12 disposed symmetrically relative to the axis on a diameter, the distance L being at least half the radius R of the cylindrical envelope constituting the solar generator 3.

The thrusters are at substantially the same axial position as the radiator 6 of the observation system 4.

In the example shown the thrusters 12 are slightly. set back towards the interior of the satellite body. In an alternative embodiment that is not shown the thrusters are offset radially outwards to a greater extent (at least $2/3$ R) but are not set back so far relative to the radiator as in FIG. 4, because of the volume available in the launch vehicle concerned.

Referring to FIG. 5, the unified propellant system is very similar to the conventional unified propellant system when there is a single apogee thruster. The system includes a pressurization stage 20 connected to a source of helium 21 and a feed circuit 22 or 23 specific to each of the two liquid propellants used, in this instance monomethylhydrazine (MMH) in the propellant tanks 24 and 25 and nitrogen peroxide ($N_2O_4$) in the propellant tanks 26 and 27.

Tests have shown that the change from one to two thrusters can be reliably achieved merely by a simple modification of the propellant feed lines 28 and 29 and the pressurization line 30, namely a slight increase (a few percent) in the diameter of the lines as conventionally used for known apogee thrusters, so as to compensate for the pressure drop resulting from the division of the flow of propellants between two branches.

Note that the thrusters 12 are identical to the conventional thrusters used singly in known apogee propulsion systems (in practice: thrusters with a thrust of 400 N).

In comparison with a conventional single thruster system, the mass penalty due to the use of two thrusters instead of one is only some 3.1 kg (2.5 kg for the additional thruster and approximately 0.6 kg for the increased diameter of the lines), which is negligible in comparison with the saving in mass (which can be as much as 200 kg) resulting from the change from solid propellant propulsion to liquid propellant propulsion.

As the FIG. 5 system is very similar to a conventional system, subject to the reservations already explained, it will not be described in more detail here. The valves P are pyrotechnic valves, normally closed (+) or normally open (−); those marked with an I are latch valves; those marked M are manually operated valves which are normally closed prior to launch.

The observation system 4 is conventional and is shown for information only in FIGS. 6 and 7.

It has a mirror 31 which reflects an incident ray S parallel to the axis onto a focussing plane P (FIGS. 6 through 8) situated in a housing 32 containing any appropriate known type infrared sensor along a transverse radiative surface 33 coated with white paint in the known way and appropriately surrounded by the frustoconical radiator 6.

Figure 9:
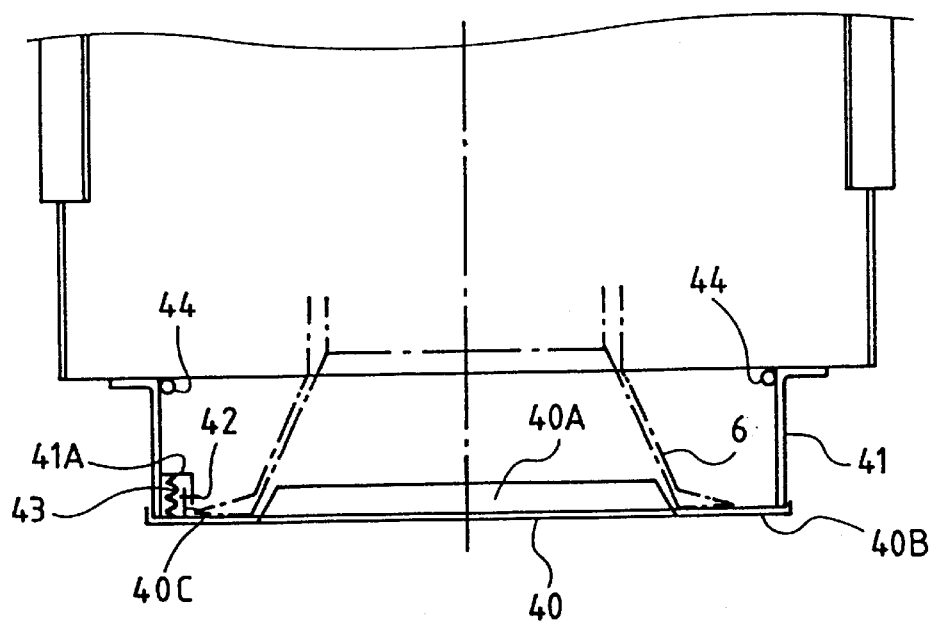
FIG. 9 is a diagram showing the radiator fitted with its jettisonable cover.

Throughout the launch phase and until the end of the apogee maneuver, the radiator 6 is masked by a jettisonable cover 40 shown diagrammatically in FIG. 9. The cover has a thick center part 40A centered in the radiator 6 and a thinner peripheral ring 40B temporarily connected to a coupling ring 41 fastened to the satellite body and disposed around the radiator. The cover is linked to the coupling ring by members 41A and 40C respectively attached to the ring and to the cover and coupled together by explosive bolts 42.

The cover is jettisoned by spring members 43 disposed axially between the jettisonable cover and the peripheral ring and released when the aforementioned explosive bolts are triggered. The spring members are in this instance axially compressed spiral springs disposed in the immediate vicinity of the members locked by the explosive bolts.

The cover is covered with super-insulation (which may be a conventional composite material based on titanium film). It is used as a cold source adapted to trap contamination resulting from combustion of the propellants; to this end the super-insulation layer is advantageously covered with a layer of white paint.

The peripheral ring is similarly covered with super-insulation; this is a composite material, for example, composed of a layer of titanium parallel to layers of Kapton which are aluminum-coated on both sides and which are held apart by glass fiber spacers. Heaters 44 are disposed near the peripheral ring. The heaters may be, for example, simple electrical heating resistor elements. The function of the heaters, after the apogee maneuver, is to vaporize the major part of any deposited product resulting from the combustion of the propellants, the gases released in this way being trapped by condensation by the cold source provided by the cover.

To give a numerical example, in the case of a satellite dry mass in the order of one ton and a dual liquid propellant (MMH/$N_2O_4$) unified propulsion system, the combustion product analysis is typically:

| | |
|---|---|
| $H_2O$ | 90 mg |
| $N_2$ | 125 mg |

-continued

|  |  |
|---|---|
| CO | 50 mg |
| $H_2$ | 5 mg |
| $CO_2$ | 25 mg |

Most of these combustion products are trapped by the cover and, therefore, removed when the latter is jettisoned, typically 24 hours after the apogee maneuver, the heaters being activated as soon as this maneuver is completed, for example.

A typical mass breakdown for the FIG. 9 system is:

|  |  |
|---|---|
| super-insulation | 750 g |
| heaters | 500 g |
| cover and springs | 2 500 g |

Table 1 sets out results obtained for various cases of asymmetrical structure or operation of the thrusters 12.

For each situation envisaged table 1 indicates the amplitude of the defect concerned, the spin rotation speed concerned, the maximum nutation observed, the velocity increment loss and the velocity increment angular offset which result.

Note that a difference of 5 mm between the distances of the thrusters from the axis results in an infinitesimal disturbance.

For a simultaneous difference of 5 mm in the distance of the two thrusters from the axis, a 1° angular offset of the thrust vector and a 16 N deviation in the thrust, the maximum nutation is 3.3°, the velocity increment loss is 2.2 m/s and the velocity increment angular offset is 0.36°, representing disturbances which are entirely acceptable and correctable. The nominal velocity increment is typically in the order of 1,500 m/s.

The above results are for a spin rotation speed of 15 rpm, which is very much lower than the spin stabilization speeds of second generation satellites, which can be as high as 100 rpm.

Consideration has even been given to the case where one thruster fails, resulting in a significant moment lever arm: at 15 rpm the disturbances resulting from any such failure become serious but provided that the rotation speed is more like 50 rpm the disturbances are within acceptable limits.

It is clear from the test results set out in table 1 that the gyroscopic stiffness associated with the set point spin rotation speeds is sufficient to maintain at acceptable levels any disturbances which may arise due to the use of a plurality of thrusters, without it being necessary to take special precautions with regard to the accuracy of mounting and operation of the thrusters.

FIGS. 10 through 12 relate to a different layout of the thrusters 12' in which they are not disposed around the radiator equipment but around the equipment on the opposite side, namely the antenna boom.

In FIGS. 10 through 12 parts analogous to those of FIGS. 1 through 3 have the same reference symbols, "primed" if there are differences as to overall structure or location.

The protection of the equipment, in this instance the boom 7, from the apogee thruster jet (thermal impact, pollution, etc) is here obtained by a heat shield 40' of any appropriate known type, the component parts of which have a titanium-based composite material covering, for example.

These parts may be fixed or removable.

In a preferred embodiment, they are articulated flaps disposed between the thrusters and the antenna boom, adapted in the deployed configuration (that shown) to protect the boom (at a time when it is not in use) and, after the apogee maneuver, to fold (transversely to the axis) against the satellite body, possibly covering the apogee thrusters whose role is now terminated, and opening up the field of view of the antennas towards the Earth.

It will be apparent that the foregoing description has been given by way of non-limiting example only and that numerous modifications will suggest themselves to those skilled in the art without departing from the scope of the invention.

TABLE 1

| SOURCE OF DISTURBANCE | AMPLITUDE | SPIN ROTATION SPEED (rpm) | MAXIMAL NUTATION (°) | VELOCITY INCREMENT LOSS (m/s) | VELOCITY INCREMENT ANGULAR OFFSET (°) |
|---|---|---|---|---|---|
| DIFFERENCES IN THRUSTER OFFSET RELATIVE TO AXIS | +5 mm | 15 | 0.6 | 0.3 | 0.06 |
| THRUST ANGULAR OFFSET | 0.5° | 15 | 0.2 | 0.2 | 0.02 |
| THRUSTER FAILURE |  | 15 | 44 | 144 | 9.6 |
| THRUSTER FAILURE IN COMBINATION |  | 50 | 5.2 | 1.7 | 0.78 |
| linear offset<br>angular offset<br>unequal thrust | +5 mm<br>1°<br>16 N | 15 | 3.3 | 2.2 | 0.36 |

There is claimed:

1. A satellite adapted to be spin-stabelized in geostationary orbit comprising:
   a satellite body having a spin rotation axis;
   a cylindrical solar generator disposed circumferentially around said satellite body;
   at least two equipments axially and oppositely disposed on said satellite body; and
   an apogee maneuvering system disposed along said spin rotation axis, said apogee maneuvering system being secured to said satellite body opposite one of said at least two equipments, said apogee maneuvering system comprising at least two thrusters oriented parallel to said spin rotation axis, each one of said at least two thrusters being offset from said spin rotation axis by an equal desitance, said at least two thrusters being equi-angularly spaced with respect to an other of said at least two equipments, said at least two thrusters further being connected to a common liquid propellant feed system.

2. A satellite according to claim 1 wherein said other of said at least two equipments disposed between said at least two thrusters is a radiator which is part of an infrared sensor observation system.

3. A satellite according to claim 1 wherein said one of said at least two equipments disposed opposite said apogee maneuvering system is a set of communication antennas.

4. A satellite according to claim 1 wherein another of said at least two equipments disposed between said at least two thrusters is a set of communication antennas.

5. A satellite according to claim 4 wherein said one of said at least two equipments disposed opposite said apogee maneuvering system is a radiator which is part of an sensor observation system.

6. A satellite according to claim 4 further comprising a heat shield disposed between said set of communication antennas and said at least two thrusters.

7. A satellite according to claim 6 wherein said heat shield comprises articulated flaps adapted to expand a field of view of said set of communication antennas after an apogee maneuver.

8. A satellite according to claim 1 wherein said at least two thrusters comprises two thrusters disposed symmetrically on opposite sides of said spin rotation axis.

9. A satellite according to claim 1 wherein a distance by which said at least two thrusters are offset from said spin rotation axis is at least half of a radius of said cylindrical solar generator.

10. A satellite according to claim 9 wherein said distance by which said at least two thrusters are offset relative to said spin rotation axis is at least two-thirds of said radius of said cylindrical solar generator.

11. A satellite according to claim 1 wherein one of said at least two equipments is a radiator, said radiator being covered by a jettisonable cover.

12. A satellite according to claim 11 wherein said jettisonable cover is a cold source and wherein said satellite further comprises heaters disposed around said radiator, said heaters being adapted, when activated, to decontaminate a lower part of said satellite.

13. A satellite according to claim 11 wherein said jettisonable cover is coupled to said satellite body by at least one explosive bolt located radially outside said radiator.

14. A satellite according to claim 11 further comprising biasing means disposed axially between said jettisonable cover and said satellite body, said biasing means being adapted to jettison said cover.

15. A satellite according to claim 14 wherein said biasing means comprises a plurality of axially compressed spiral springs.

16. A satellite according to claim 1 wherein said liquid propellant feed system is also connected to orbit correction and attitude control thrusters.

* * * * *

UNITED STATES PATENT AND TRADEMARK OFFICE
CERTIFICATE OF CORRECTION

PATENT NO. : 6,264,145 B1  
DATED : July 24, 2001  
INVENTOR(S) : Maute

Page 1 of 1

It is certified that error appears in the above-identified patent and that said Letters Patent is hereby corrected as shown below:

Column 2,  
Line 26, delete "sittated" and insert -- situated --.

Column 3,  
Line 41, delete "jetison" and insert -- jettison --.

Column 5,  
Line 42, delete a period ".".  
Line 67, delete a colon ":".

Column 8,  
Line 57, delete "stabelized" and insert -- stabilized --.

Column 9,  
Line 4, delete "desitance" and insert -- distance --.
Line 21, after "an" insert -- infrared --.

Signed and Sealed this

Twenty-sixth Day of March, 2002

*Attest:*

*Attesting Officer*

JAMES E. ROGAN  
*Director of the United States Patent and Trademark Office*